(12) United States Patent
Kim et al.

(10) Patent No.: US 10,735,192 B2
(45) Date of Patent: Aug. 4, 2020

(54) METHOD OF MANAGING TOKEN AND SERVER FOR PERFORMING THE SAME

(71) Applicant: SAMSUNG SDS CO., LTD., Seoul (KR)

(72) Inventors: Sung-Min Kim, Seoul (KR); Mi-Ran Kim, Seoul (KR); Nam-Soo Jeon, Seoul (KR); Won-Kyoung Kim, Seoul (KR); Hyo-Jin Yoon, Seoul (KR); Ki-Young Kim, Seoul (KR); Jang-Hyuk Ahn, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 251 days.

(21) Appl. No.: 15/993,213

(22) Filed: May 30, 2018

(65) Prior Publication Data

US 2018/0351741 A1 Dec. 6, 2018

(30) Foreign Application Priority Data

May 31, 2017 (KR) ........................ 10-2017-0067443

(51) Int. Cl.
*H04L 29/06* (2006.01)
*H04L 9/08* (2006.01)
*H04L 9/32* (2006.01)

(52) U.S. Cl.
CPC .......... *H04L 9/0891* (2013.01); *H04L 9/0819* (2013.01); *H04L 9/0877* (2013.01); *H04L 9/3213* (2013.01); *H04L 9/3239* (2013.01); *H04L 9/3242* (2013.01); *H04L 2209/38* (2013.01)

(58) Field of Classification Search
CPC ... H04L 9/0891; H04L 9/0819; H04L 9/3242; H04L 2209/38; H04L 9/0877; H04L 9/3239; H04L 9/3213
See application file for complete search history.

(56) References Cited

U.S. PATENT DOCUMENTS

| | | | |
|---|---|---|---|
| 7,721,102 B2* | 5/2010 | Won | H04L 63/06 713/156 |
| 2009/0198619 A1* | 8/2009 | Tripunitara | G06Q 20/02 705/71 |

* cited by examiner

*Primary Examiner* — Tri M Tran
(74) *Attorney, Agent, or Firm* — Sughrue Mion, PLLC

(57) ABSTRACT

A method of managing a token and a server for performing the same are provided. According to the embodiments of the present disclosure, it is possible to easily authenticate a counterpart device using a one-time key $H^N(T)$ for a D2D communication between a first device and a second device, without using a separate secure channel (e.g., secure sockets layer (SSL), transport layer security (TLS), or the like) in an environment where it is difficult to synchronize the first device with the second device without intervention of a server.

13 Claims, 13 Drawing Sheets

METHOD OF MANAGING TOKEN AND SERVER FOR PERFORMING THE SAME

CROSS-REFERENCE TO RELATED APPLICATION(S)

This application claims the benefit under 35 USC § 119(a) of Korean Patent Application No. 10-2017-0067443, filed on May 31, 2017, in the Korean Intellectual Property Office, the entire disclosure of which is incorporated herein by reference for all purposes.

BACKGROUND

1. Field

The following description relates to a device-to-device (D2D) communication technology.

2. Description of Related Art

Recently, as the use of mobile devices, such as smart phones, tablet personal computers (PCs), sensors, and the like, is increasing, problems of overload and frequency exhaustion of the network are emerging. A device-to-device (D2D) communication is one solution to remedy such problems.

A D2D communication refers to a communication technology in which devices directly communicate with each other without the aid of an infrastructure, such as a base station, a wireless access point (AP), or the like. The D2D communication has advantages in that it distributes traffic transmitted to a base station and enables rapid communication between neighboring devices.

The D2D communication may be used in the process of providing an Internet of Things (IoT) service utilizing a mobile device. In one example, a user may be able to remotely control an IoT device, such as a door lock, a vehicle, or the like, using a mobile device equipped with a short-range wireless communication module (e.g., a Bluetooth module, a near-field communication (NFC) module, or the like). In this case, both devices transmit and receive data therebetween through the D2D communication and execute a command (e.g., unlock of a door lock, door open/close and power off of a vehicle, or the like) according to a policy.

However, according to a prior art, there is a risk of leakage of data transmitted via the D2D communication. Particularly, in the case of an IoT service, due to low power and low specification platform limitations, conventional security techniques have a problem that it is difficult to completely deviate from the security threat due to data leakage.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure are provided to improve and effectively manage security of data transmitted during a device-to-device (D2D) communication.

In one general aspect, there is provided a server comprising: at least one processor configured to implement: a token manager configured to: generate, upon receiving an input policy, a key token associated with a validity period, and obtain a plurality of first hash values by hashing the key token a number of times up to a maximum count; a first device manager configured to transmit the plurality of first hash values and information about the maximum count to a first device; and a second device manager configured to transmit an initial hash value of the key token and the information about the maximum count to a second device, wherein the token manager may be further configured to, based on at least one of the validity period, a value of the maximum count, and the input policy: discard either or both of the key token and the maximum count.

The first device manager may be further configured to transmit the plurality of first hash values to the second device one by one in a reverse order of a generation of the plurality of first hash values, and wherein the token manager may be further configured to: receive, when a value of a first maximum count stored at the first device is smaller than or equal to a set value and the validity period is more than a set period, a request from the first device to update the key token and the first maximum count, and to update the key token and the first maximum count at the first device in response to the request for update.

The token manager may be further configured to: receive a request from the first device to discard the key token, and discard the key token in response to the request.

The token manager may further configured to discard the key token when a current time indicates that the validity period is expired.

The at least one processor may be further configured to implement: a policy manager configured to receive the input policy, wherein the token manager may be further configured to update, when the input policy received by the policy manager is changed, either or both of the key token and the maximum count.

The first device manager may be further configured to receive, from the first device, information about a first maximum count stored at the first device, and wherein the second device manager may be further configured to receive, from the second device, information about a second maximum count stored at the second device, and wherein the token manager may be further configured to compare the first maximum count with the second maximum count to determine whether a hash code synchronization has completed successfully.

In another general aspect, there is provided a method of managing a token, comprising: generating, at a token manager upon receiving an input policy, a key token associated with a validity period; obtaining, by the token manager, a plurality of first hash values by hashing the key token a number of times up to a maximum count; transmitting, by a first device manager, the plurality of first hash values and information about the maximum count to a first device; transmitting, by a second device manager, an initial hash value of the key token and the information about the maximum count to a second device; and discarding, by the token manager based on at least one of the validity period, a value of the maximum count, and the input policy, either or both of the key token and the maximum count.

The transmitting by a first device manager may be further comprises: transmitting the plurality of first hash values to the second device one by one in a reverse order of generation of the plurality of first hash values, deleting, after transmitting an Nth first hash value among the plurality of first hash values, the Nth first hash value, and wherein the discarding by the token manager comprises receiving a request from the first device to update the key token and the maximum count, and updating the key token and the maximum count at the first device in response to the request for update.

The discarding by the token manager may further comprise: receiving a request from the first device to discard the key token, and discarding the key token.

The discarding by the token manager may comprise discarding the key token when the validity period is expired.

The method may further comprise, after the transmitting by the second device manager: receiving, by the first device manager from the first device, second information about a first maximum count stored at the first device; receiving, by the second device manager from the second device, third information about a second maximum count stored at the second device; and comparing, at the token manager, the first maximum count with the second maximum count to determine whether a hash code synchronization has completed successfully.

In another general aspect, there is provided a method of managing a token, comprising: generating, at a token manager upon receiving an input policy, a key token associated with a validity period; obtaining, by the token manager, a plurality of first hash values by hashing the key token a number of times up to a maximum count; transmitting, by a first device manager, the plurality of first hash values and information about the maximum count to a first device; transmitting, by a second device manager, an initial hash value of the key token and the information about the maximum count to a second device; and updating, by the token manager based on at least one of the validity period, a value of the maximum count, and the input policy, either or both of the key token and the maximum count, wherein a server comprises the token manager, the first device manager, the second device manager, and a policy manager.

The method may further comprise receiving, prior to the generating of the key token at the token manager, an input policy, wherein the updating by the token manager comprises updating either or both of the key token and the maximum count when the input policy received by the policy manager is changed.

Other features and aspects will be apparent from the following detailed description, the drawings, and the claims.

Figure 1:
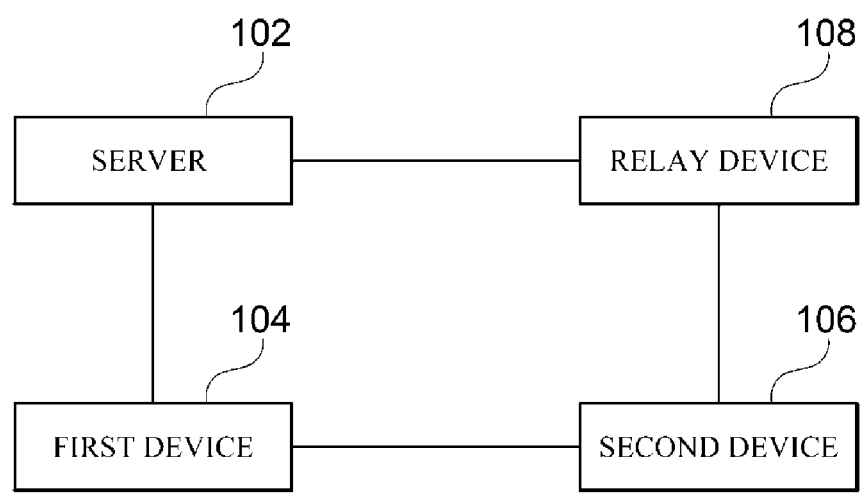
FIG. 1 is a block diagram illustrating a detailed configuration of a communication system according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram illustrating a detailed configuration of a communication system 100 according to one embodiment of the present disclosure. As shown in FIG. 1, the communication system 100 according to one embodiment of the present disclosure which is a system for supporting a device-to-device (D2D) communication between a first device 104 and a second device 106 includes a server 102, the first device 104, the second device 106, and a relay device 108.

The server 102 is a device configured to generate and manage a key token for D2D communication between the first device 104 and the second device 106. According to the embodiments, the key token may be one of smart keys used in performing commands (e.g., a door unlock command, a vehicle door open and close command, a vehicle power off command, and the like). The key token may be generated based on information on the first device 104, information on the second device 106, identification (ID) of an policy, a user ID, and the like.

The server 102 may receive a policy from a legacy system (not shown) or the like and generate the key token according to the policy. In this case, the legacy system is a system for providing various services to a user in association with the server 102 and may provide one or more policies corresponding to a user's request among a plurality of predefined policies. In one example, the server 102 may receive a content policy from a home network system (not shown) to allow automatic unlock of a door lock when the user approaches the door lock. In another example, when the user reserves the use of a vehicle, the server 102 may receive a content policy from a car-sharing system (not shown) to allow for a remote control of door opening/closing, power on/off of a vehicle, or the like according to a user's input during a reservation period input by the user. In this case, the key token may have a predetermined validity period (e.g., 5 days) and the validity period may vary according to the policy (e.g., the above described reservation period). As described below, the second device 106 may receive information about the validity period from the server 102 perform authentication of the first device 104 and command execution only within the validity period.

In addition, the server 102 may store and manage information about the user who is provided with a service, information on a device possessed by the user (e.g., a type, identification information, and the like of the device), information on a device to be controlled (e.g., a type, identification information, controllable command information and the like of the device), information about policies available to be input, information about a generated key token and validity period (e.g., information about starting time and end time), a hash code which will be described below, and the like.

Moreover, the server 102 generates a hash code using one generated key token and transmits the generated hash code to each of the first device 104 and the second device 106. More specifically, the server 102 may generate a plurality of first hash values by repeatedly hashing the key token (or an initial hash value of the key token) as many times as the set maximum count. In addition, the server 102 may generate a chain of the first hash values by sequentially connecting the generated first hash values in order of the number of times by which a hash function is applied (or the order in which each of the first hash values is generated). In this case, the maximum count is the number of sequentially connected first hash values, and may vary according to the policy and the validity period of the key token. In one example, when the user reserves a vehicle for 5 days, the validity period of the key token may be 5 days and the maximum count may be 100. In another example, when the user reserves a vehicle for 3 days, the validity period of the key token may be 3 days and the maximum count may be 50. An example of first hash values sequentially connected in this manner is as shown below.

$$H^1(T)-H^2(T)-H^3(T) \ldots H^{99}(T)-H^{100}(T)(\text{assuming the maximum count}=100)$$

Here, $H^1(T)$ may be a hash value obtained by applying a hash function once to a key token (or an initial hash value of the key token), $H^2(T)$ may be a hash value (i.e., a hash value of $H^1(T)$) obtained by applying a hash function twice to the key token (or an initial hash value of the key token), and $H^{100}(T)$ may be a hash value (i.e., a hash value of $H^{99}(T)$) obtained by applying a hash function one-hundred times to the key token (or an initial hash value of the key token). In addition, T represents the key token. That is, $H^N(T)$ is a value obtained by applying a hash function N times to the key token T or an initial hash value of the key token T. $H^N(T)$ may be used as a one-time key for a D2D communication between two devices in an environment where it is difficult to synchronize the first device 104 and the second device 106 without intervention of the server 102.

The server 102 may transmit the sequentially connected first hash values to the first device 104. In this case, the server 102 may transmit the policy, the information about the maximum count, the information on the validity period of the key token, and the like to the first device 104 together with the first hash values.

In addition, the server 102 may transmit an initial hash value of the key token, the information about the maximum count, the policy, and the information on the validity period of the key token to the second device 106. In this case, the server 102 may transmit the aforesaid information to the second device 106 through the relay device 108. Since a communication channel between the server 102 and the second device 106 may be relatively insecure than a communication channel between the server 102 and the first device 104, the server 102 may transmit not all the hash values for the key token, for example, $H^1(T)-H^2(T)-H^3(T) \ldots H^{99}(T)-H^{100}(T)$, but only the initial hash value for the key token and the set maximum count to the second device 106. As described below, the second device 106 may receive one of the first hash values from the first device 104 and authenticate the first device 104 using the first hash value received from the first device 104 and information about the first hash value and the maximum count received from the server 102.

In addition, the server 102 may synchronize the chains of the hash values stored in both devices 104 and 106 using the values of maximum count in each of the first device 104 and the second device 106.

Moreover, the server 102 may update one or more of the key token and the maximum count in consideration of the validity period of the key token, a value of the maximum count in the first device 104 (or the number of first hash values stored in the first device 104) and the policy input to the server 102.

Furthermore, the server 102 may discard the generated key token according to whether the validity period of the key token or policy has expired. The generation of the key token, the synchronization of the chains stored in both devices 104 and 106, and the update and discard of the key token will be described below in more detail with reference to FIGS. 6 to 12. Hereinafter, for convenience of description, the maximum count stored in the first device 104 will be referred to as a first maximum count and the maximum count stored in the second device 106 will be referred to as a second maximum count. The first maximum count and the second maximum count may be initially generated by the server 102 and then be distributed to the first device 104 and the second device 106, but aspects of the present disclosure are not limited thereto. As described below, the first device 104 may transmit a first hash value corresponding to the first maximum count to the second device 106 and may decrease the first maximum count by one each time the first hash value is transmitted. In addition, the second device 106 may reduce the second maximum count to N when a second hash value hashed N times is identical to the first hash value received from the first device 104.

The first device 104 is a device that controls operations of the second device 106 through a D2D communication with the second device 106, and may be, for example, a smartphone, a tablet personal computer (PC), a wearable device, such as a smart watch, or the like. In the present embodiments, the first device 104 may be a portable mobile device which can be carried by a user. In addition, the first device 104 may be equipped with a security-related application and may perform various functions, which will be described below, through the application.

As described above, the first device 104 may receive the sequentially connected first hash values (e.g., $H^1(T)$–$H^2(T)$–$H^3(T)$ ... $H^{99}(T)$–$H^{100}(T)$), the policy input from the server 102, and the information about the first maximum count and the validity period of the key token from the server 102. In addition, the first device 104 may encrypt the received first hash values and the information about the first maximum count and the validity period of the key token and store the encrypted information in an internal security area (i.e., storage).

Thereafter, the first device 104 may transmit a first hash value corresponding to the first maximum count among the sequentially connected first hash values to the second device 106 for the D2D communication with the second device 106, and may decrease the first maximum count by one each time the first hash value is transmitted. In one example, the first device 104 may firstly transmit the last first hash value of the sequentially connected first hash values to the second device 106 and then transmit the first hash value immediately preceding the last connected first hash value to the second device 106. In the above example, the first device 104 may transmit $H^{100}(T)$, $H^{99}(T)$, $H^{98}(T)$, and so on to the second device 106 by one at a time and decrease the first maximum count by one, for example, 100→99, 99→98, 98→97, and so on, each time each of $H^{100}(T)$, $H^{99}(T)$, $H^{98}(T)$, and the like is transmitted to the second device 106. As such, each time the first device 104 attempts to communicate with the second device 106, the first device 104 exhausts the first hash value connected to the very end of the chain, and accordingly, the maximum count in the first device 104 is decreased by one.

When a value of the maximum count in the first device 104 (or the number of the first hash values connected to the chain) is smaller than or equal to a set value (e.g., 1) in a state where the validity period of the key token remains more than a predetermined period, the first device 104 may request the server 102 to update the key token and the first maximum count. In one example, assuming that the validity period of the key token is from $1^{st}$ of May to $10^{th}$ of May, when a value of the maximum count in the first device 104 becomes 1 in a state where a period from a present date (e.g., $3^{rd}$ of May) to an expiration date of the validity period remains more than 5 days, the first device 104 may request the server 102 to update the key token and the first maximum count. In this case, the server 102 may update the key token and the first maximum count according to the request from the first device 104 and transmit the updated key token and new first hash values generated from the updated first maximum count, a sequential connection relationship among the new first hash values, and information about the updated first maximum count to the first device 104.

In addition, when a value of the maximum count in the first device 104 is smaller than or equal to a set value (e.g., 1) (or when the first hash values connected to the chain are all exhausted) in a state where the validity period of the key token remains less than the predetermined period or when the remaining validity period of the key token is expired, the first device 104 may request the server 102 to discard the key token. In one example, assuming that the validity period of the key token is from $1^{st}$ of May to $10^{th}$ of May, when the value of the maximum count in the first device 104 becomes 1 in a state where a period from a present date (e.g., $9^{th}$ of May) to an expiration date of the validity period is less than 2 days, the first device 104 may request the server 102 to discard the key token. In this case, the server 102 may request each of the first device 104 and the second device 106 to discard the remaining hash code (i.e., the chain of the hash values) and when the discard of the hash code is completed in each of the first device 104 and the second device 106, the key token stored in the server 102 may be discarded.

The second device 106 is a device to be controlled, and may be, for example, an Internet of Things (IoT) device, such as a door lock, a vehicle sensor, or the like, or a security module mounted in the IoT device.

As described above, the second device 106 may receive an initial hash value of the key token, information about the second maximum count, the policy input to the server 102, information about the validity period of the key token, and the like, from the server 102. In this case, the second device 106 may receive the aforesaid information from the server 102 through the relay device 108. In addition, the second device 106 may store the received initial hash value of the key token, information about the second maximum count, policy input to the server 102, information about the validity period of the key token, and the like in an internal security area (i.e., storage).

Moreover, the second device 106 may receive one of the first hash values from the first device 104. As described above, the first device 104 may transmit a first hash value corresponding to a current first maximum count among the first hash values to the second device 106. As the second device 106 receives one of the first hash values from the first device 104, the second device 106 may authenticate the first device 104 using the received first hash value, the initial hash value received from the server 102, and the information about the second maximum count.

More specifically, the second device 106 may authenticate the first device 104 by comparing the received first hash values with each of the second hash values generated by repeatedly hashing the initial hash value a number of times up to a value of the second maximum count until a value identical to the first hash value received from the first device 104 appears. In this case, the second device 106 may generate the second hash values using the same hash function as the hash function used in the server 102. In one example, the second device 106 may compare a value obtained by applying the hash function once to the initial hash value with the first hash value, and when the value is not identical to the first hash value, may compare a value obtained by applying the hash function twice to the initial hash value with the first hash value. As such, the second device 106 may repeatedly hash the initial hash value a number of times less than the second maximum count until a value identical to the first hash value is generated, and may compare each of the second hash values generated in this manner with each of the first hash values.

When a second hash value identical to the first hash value appears, the second device 106 may determine that authentication of the first device 104 is completed.

In addition, the second device 106 may decrease the second maximum count based on the second hash value identical to the first hash value. More specifically, when a second hash value hashed N times is identical to the first hash value, the second device 106 may decrease the second maximum count to N. For example, when a second hash value obtained by applying the hash function 50 times is identical to the first hash value, the second device 106 may decrease the second maximum count to 50. According to the embodiments of the present disclosure, even when the first device 104 and the second device 106 have different maximum counts, it may be possible to authenticate the first device 104.

The relay device 108 relays data between the server 102 and the second device 106. The relay device 108 may receive data from the server 102, convert the data into a form receivable by the second device 106 and transmit the converted data to the second device 106. In addition, the relay device 108 may receive data from the second device 106, convert the data into a form receivable by the server 102, and transmit the converted data to the server 102. Meanwhile, the relay device 108 is described as relaying the data between the server 102 and the second device 106, but this is merely one example, and the server 102 and the second device 106 may directly transmit and receive data therebetween without the separate relay device 108.

Figure 2:
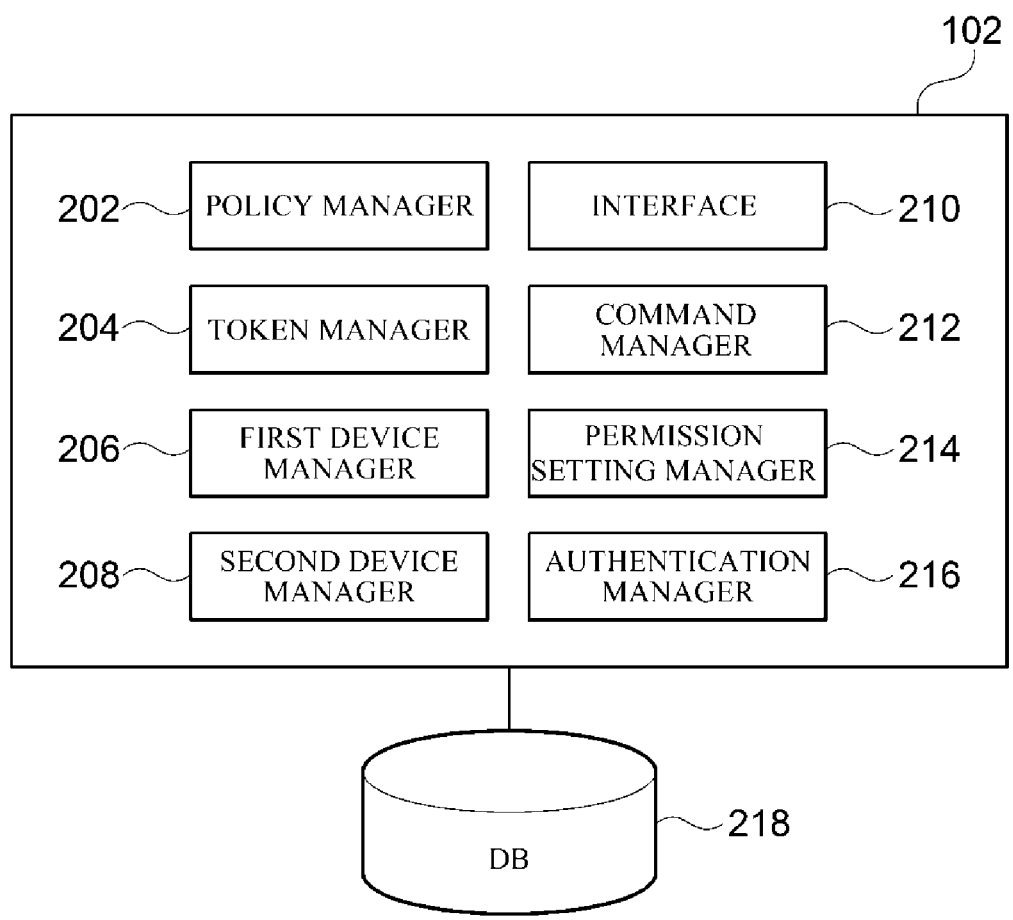
FIG. 2 is a block diagram illustrating a detailed configuration of a server according to one embodiment of the present disclosure.

FIG. 2 is a block diagram illustrating a detailed configuration of the server 102 according to one embodiment of the present disclosure. As shown in FIG. 2, the server 102 according to one embodiment of the present disclosure includes a policy manager 202, a token manager 204, a first device manager 206, a second device manager 208, an interface 210, a command manager 212, a permission setting manager 214, and an authentication manager 210, and may be connected to a database 210 according to an embodiment.

The policy manager 202 receives a policy from a legacy system (not shown). In addition, the policy manager 202 may manage identification code for each policy and each time a policy is input, the policy manager 202 may identify the policy by checking the identification code of the policy. In addition, the policy manager 202 may request the token manager 204 to generate, update, and discard a key token, respectively, when the policy is input, changes, and expires. Specifically, when a new policy is input or the policy is changed, the policy manager 202 may request the token manager 204 to generate or update a key token, and when a validity period of the policy has expired, may request the token manger 204 to discard a key token.

The token manager 204 manages the generation, update, and discard of the key token. The token manager 204 may generate the key token as the policy is input through the policy manger 202. In addition, the token manager 204 may update or discard one or more of the key token and the maximum count in consideration of one or more of a validity period of the key token, the value of the maximum count in the first device 104, and the policy input to the server 102. That is, the token manager 204 may manage a life cycle of the key token dependent on the policy.

In addition, the token manager 204 may generate a hash code based on the generated key token. Specifically, the token manger 204 may generate a plurality of first hash values by repeatedly hashing the key token as many times as the set maximum count, and generate a chain of the first hash values by sequentially connecting the first hash values in order of the number of times by which a hash function is applied. In this case, the maximum count is the number of sequentially connected first hash values, and may vary according to the policy and the validity period of the key token. In addition, the token manager 204 may update the hash code when the key token is updated, and may discard the hash code when the key token is discarded.

In addition, the token manager 204 may synchronize chains of hash values stored in both the first and second devices 104 and 106 using values of the maximum count in each of the first device 104 and the second device 106.

The first device manager 206 transmits and receives data to and from the first device 104. The first device manager 206 may transmit the sequentially connected first hash values (i.e., the chain of the first hash values), the policy, information about the maximum count, information about the validity period of the key token, and the like to the first device 104. In addition, the first device manager 206 may request the first device 104 to synchronize the hash code and receive the stored information about the maximum count from the first device 104. Further, the first device manager 206 may request the first device 104 to discard the hash code according to a request of the token manger 204.

The second device manager 208 transmits and receives data from and to the second device 106. The second device manager 208 may transmit an initial hash value of the key token, information about the maximum count, the policy, information about the validity period of the key token, and the like to the second device 106. In addition, the second device manager 208 may request the second device 106 to synchronize the hash code and receive the stored information about the maximum count from the second device 106. In addition, the second device manager 208 may request the second device 106 to discard the hash code according to a request of the token manager 204.

The interface 210 is a module for transmitting and receiving data to and from the legacy system, the first device 104, and the second device 106. The policy manger 202 may receive a policy from the legacy system through the interface 210. In addition, the first device manager 206 may transmit and receive a variety of data from and to the first device 104 through the interface 210. Moreover, the second device manager 208 may transmit and receive data from and to the second device 106 through the interface 210. In this case, the second device manger 208 may transmit and receive a variety of data from and to the second device 106 via the relay device 108, and in this case, the interface 201 may be used in relaying the data between the server 102 and the relay device 108.

The command manager 212 manages various commands for controlling the second device 106. The command manager 212 may include one or more commands corresponding to the respective policies, and when a command for each of the policies needs to be modified, may update the command. The command for each of the policies may be mapped to the corresponding policy, and the first device 104 and the second device 106 may identify one or more commands corresponding to the received policy by referring to information about the policy received from the server 102. The command may be, for example, door-lock/unlock commands, power on/off commands, navigation information inquiry command, or location information inquiry command for a reserved vehicle.

The permission setting manager 214 manages information about a user provided with a service, information on the first device 104, and information on the second device 106. The permission setting manager 214 may register the information on the first and second devices 104 and 106. Here, the information on the first device 104 may be, for example, a type and identification information of the first device 104, an ID and password of a user who possesses the first device 104, or the like. In addition, the information on the second device 106 may be, for example, a type and identification information of the second device 106, information about controllable operations (e.g., door lock/unlock, power on/off, etc.) of the second device 106, or other information (e.g., if the second device 106 is a vehicle, navigation information, location information or the like of the vehicle.

The authentication manager 216 authenticates the first device 104 and the second device 106 in association with the permission setting manager 214. The authentication manager 216 may authenticate the first device and the second device, respectively, using the above-described information on the first device 104 and information on the second device 106 when there is a login request of the first device 104 and the second device 106 to access.

The database 218 is a repository in which a variety of information necessary for a D2D communication between the first device 104 and the second device 106 is stored. For example, one or more policies, commands for each of the policies, a token key, a hash code of the token key, the information on the first and second devices 104 and 106, and the like may be stored in the database 218. Although the database 218 is illustrated as being connected to the server 102 for convenience of description in FIG. 1, it is merely an example, and the database 218 may be inside the server 102 as one configuration of the server 102.

Figure 3:
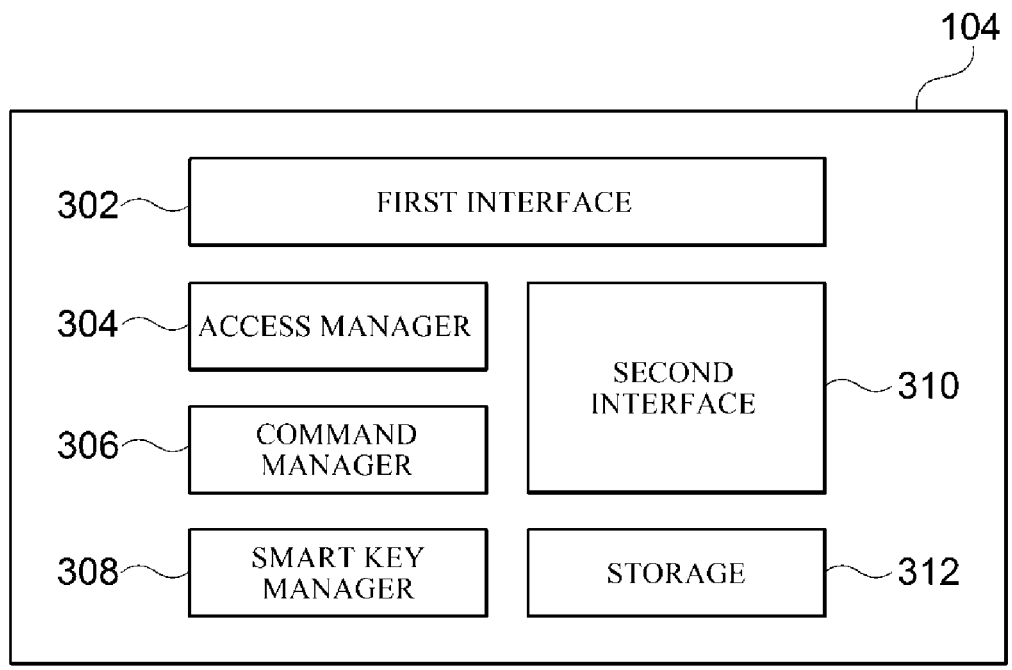
FIG. 3 is a block diagram illustrating a detailed configuration of a first device according to one embodiment of the present disclosure.

FIG. 3 is a block diagram illustrating a detailed configuration of the first device 104 according to one embodiment of the present disclosure. As shown in FIG. 3, the first device 104 according to one embodiment of the present disclosure includes a first interface 302, an access manager 304, a command manager 306, a smart key manager 308, a second interface 310, and a storage 312.

The first interface 302 is a module for transmitting and receiving data to and from the server 102. The first device 104 may transmit and receive a variety of data to and from the server 102 through the first interface 302.

The access manager 304 requests login to the server 102 according to a request of the user. In addition, when the access manager 304 may provide the information on the first device 104 to the server 102 and the server 102 may authenticate the first device 104 using the information on the first device 104 received from the access manager 304.

The command manager 306 manages various commands for controlling the second device 106. The command manager 306 may be provided with one or more commands corresponding to each of the policies and may transmit information about a command corresponding to the policy received from the server 102 to the second device 106 along with the policy.

The smart key manager 308 may receive the sequentially connected first hash values (i.e., a chain of the first hash values), the policy, information about the first maximum count, information about the validity period of the key token, and the like from the server 102. In addition, the smart key manager 308 may transmit the sequentially connected first hash values to the second device 106 one at a time and after the first hash value is transmitted, the smart key manager 308 may delete the first hash value from the chain of the first hash values, thereby exhausting the first hash values one by one. That is, when the smart key manager 208 transmits a first hash value (i.e., $H^N(T)$) obtained by applying a hash function N times to the key token to the second device 106, the smart key manager 308 may delete the $H^N(T)$ from the chain and decrease the stored first maximum count from N to N−1.

In addition, when the number of the first hash values connected to the chain (or a value of the maximum count in the first device 104) is smaller than or equal to a set value (e.g., 1) in a state where the validity period of the key token remains more than a set period, the smart key manager 308 may request the server 102 to update the key token and the first maximum count.

The second interface 310 is a module for transmitting and receiving data to and from the second device 106. The first device 104 may transmit and receive a variety of data to and from the second device 106 through the second interface 310. The second interface 310 may be, for example, a wireless communication module, such as a Wi-Fi module, a Bluetooth low energy (BLE) module, a near-field communication (NFC) module, a ZigBee module, or the like.

The storage 312 is a repository in which a variety of information necessary for a D2D communication between the first device 104 and the second device 106. The first hash values, policy, and information about the first maximum count received from the server 102 may be stored in the smart key manager 308.

Figure 4:
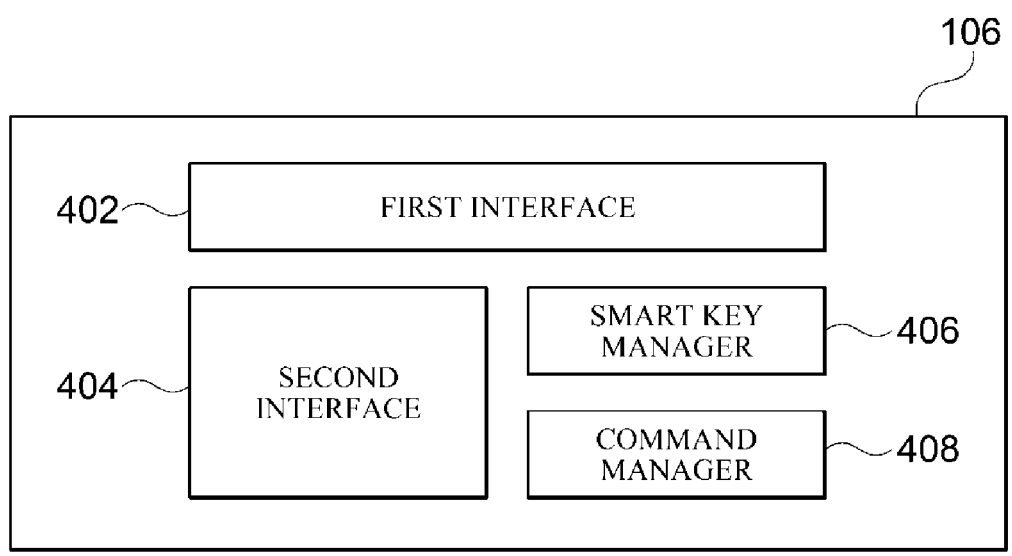
FIG. 4 is a block diagram illustrating a detailed configuration of a second device according to one embodiment of the present disclosure.

FIG. 4 is a block diagram illustrating a detailed configuration of the second device 106 according to one embodiment of the present disclosure. As shown in FIG. 4, the second device 106 includes a first interface 402, a second interface 404, a smart key manager 406, and a command manager 408.

The first interface 402 is a module for transmitting and receiving data to and from the server 102. The second device 106 may transmit and receive a variety of data to and from the server 102 through the first interface 402. In this case, the second device 106 may transit and receive a variety of data to and from the server 102 via the relay device 108, and in this case, the first interface 402 may be used in relaying the data between the second device 106 and the relay device 108.

The second interface 404 is a module for transmitting and receiving data to and from the first device 104. The second device 106 may receive a variety of data from the first device 104 through the second interface 404. The second interface 404 may be, for example, a wireless communication module, such as a Wi-Fi module, a BLE module, an NFC module, or a ZigBee module.

The smart key manager 406 receives an initial hash value of a key token, information on the second maximum count, an policy, information about a validity period of the key token, and the like from the server 102. In addition, the smart key manager 406 may receive one of the first hash values from the first device 104 and authenticate the first device 104 using the first hash value received from the first device 104, the initial hash value received from the server 102, and the information about the second maximum count.

Specifically, the smart key manager 406 may authenticate the first device 104 by comparing the received first hash values with each of the second hash values generated by repeatedly hashing the initial hash value a number of times up to the value of the second maximum count until a value identical to the first hash value received from the first device 104 appears.

In addition, the smart key manager 406 may decrease the second maximum count based on the second hash value identical to the first hash value. In one example, when a second hash value hashed N times is identical to the first hash value, the smart key manger 406 may decrease the second maximum count to N.

The command manager 408 may execute a command corresponding to the policy received from the first device

104 when the smart key manager 406 successfully authenticates the first device 104. In one example, when the first hash value received from the first device 104 is identical to the second hash value generated by the second device 106, the command manager 408 may unlock the door lock of the vehicle.

Figure 5:
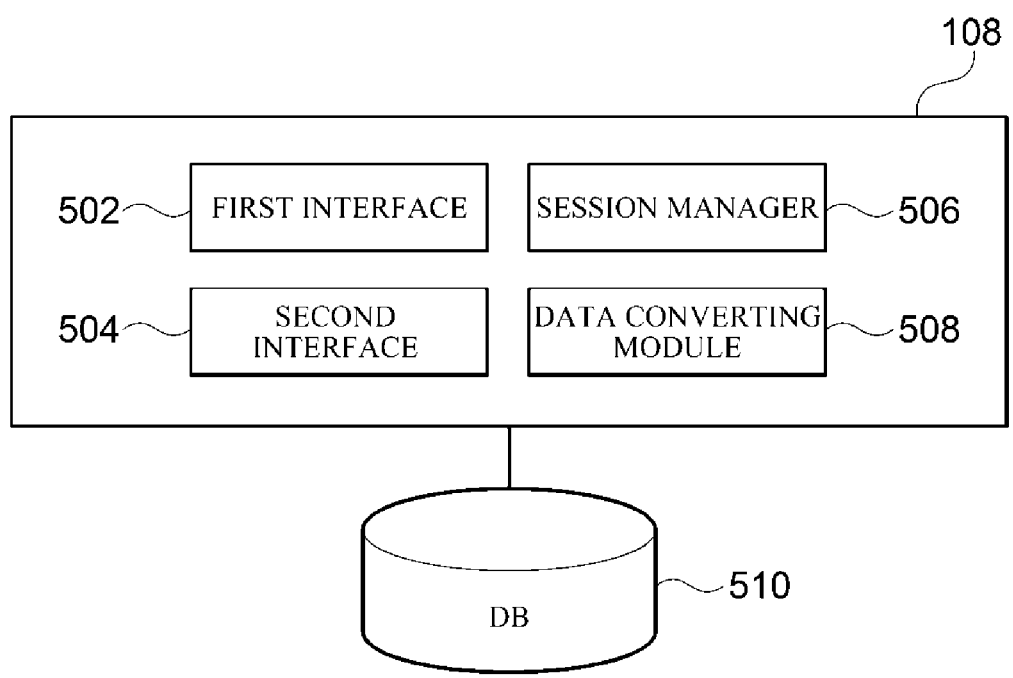
FIG. 5 is a block diagram illustrating a detailed configuration of a relay device according to one embodiment of the present disclosure.

FIG. 5 is a block diagram illustrating a detailed configuration of the relay device 108 according to one embodiment of the present disclosure. As shown in FIG. 5, the relay device 108 according to one embodiment of the present disclosure includes a first interface 502, a second interface 504, a session manager 506, and a data converting module 508, and may be connected to a database 510 according to an embodiment.

The first interface 502 is a module for transmitting and receiving data to and from the server 102. The relay device 108 may transmit and receive a variety of data to and from the server 102 through the first interface 502.

The second interface 504 is a module for transmitting and receiving data to and from the second device 106. The relay device 108 may transmit and receive a variety of data to and from the second device 106 through the second interface 504. In addition, the relay device 108 may support, for example, a message queuing telemetry transport (MQTT) protocol and may transmit and receive a variety of data to and from the second device 106 through the MQTT protocol.

The session manager 506 manages session information of the second device 106.

The data converting module 508 converts the data received from the server 102 into a form receivable by the second device 106, or convert the data received from the second device into a form receivable by the server 102.

The database 510 is a repository in which a variety of information necessary for a communication between the server 102 and the second device 106. For example, the information of the second device 106, session information (e.g., session ID, etc.) and the like may be stored in the database 510.

Figure 6:
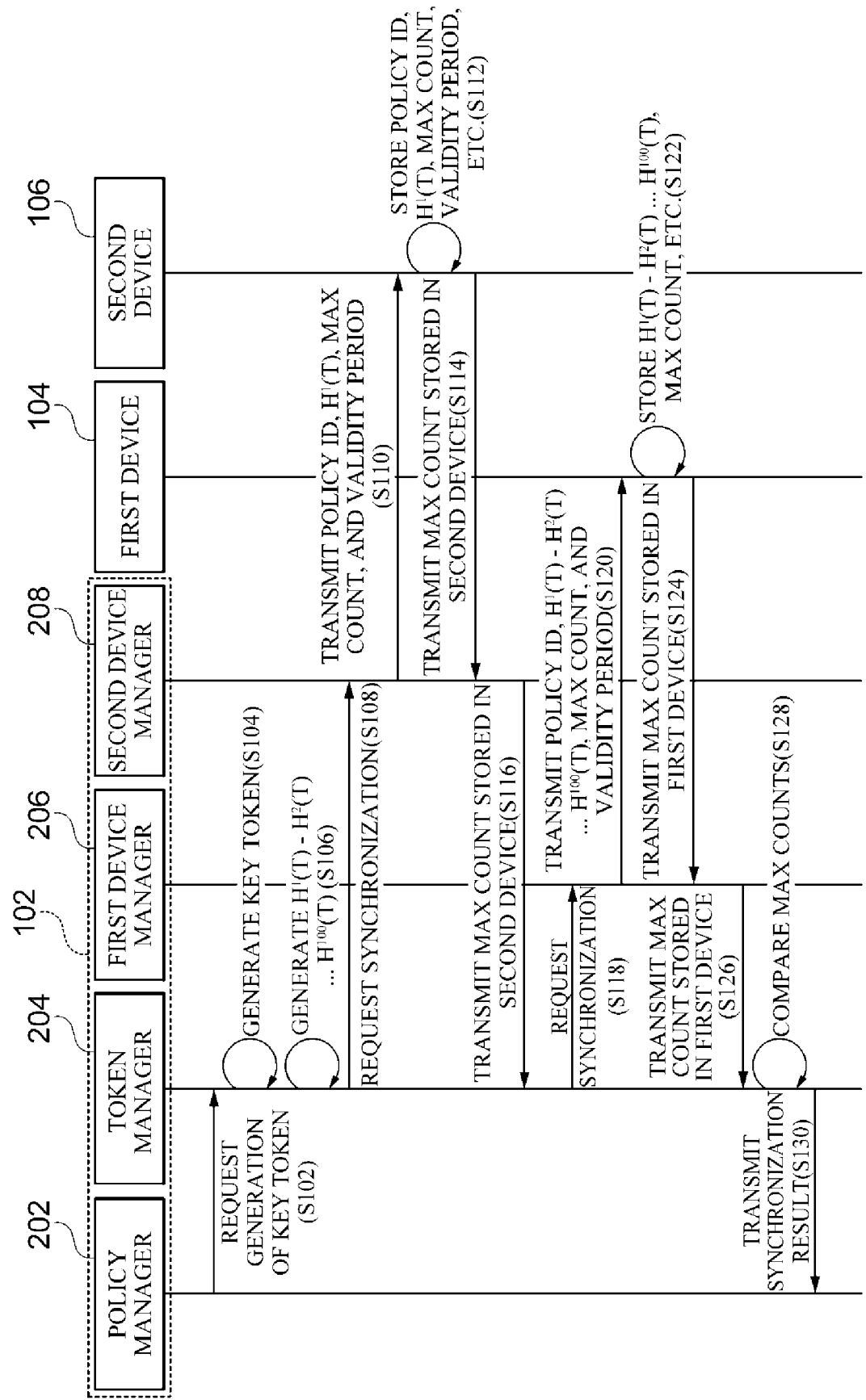
FIG. 6 is a flowchart illustrating a process of generating a key token and distributing a hash code according to one embodiment of the present disclosure.

FIG. 6 is a flowchart illustrating a process of generating a key token and distributing a hash code according to one embodiment of the present disclosure. In flowcharts of FIGS. 6 to 12, the process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation S102, a policy manager 202 requests a token manger 204 to generate a key token T according to an input of a policy.

In operation S104, the token manager 204 generates the key token T.

In operation S106, the token manager 204 sequentially connects first hash values in order of the number of times by which a hash function is applied wherein the first hash values are obtained by repeatedly hashing the key token T (or an initial hash value of the key token T) as many times as a set maximum count. In this case, for convenience of description, it is assumed that the maximum count is 100.

In operation S108, the token manager 204 requests a second device manager 208 to synchronize the hash code.

In operation S110, the second device manager 208 searches for a second device 106 and requests hash code synchronization while transmitting an initial hash value of the key token, information about the maximum count, the policy, information about a validity period of the key token, and the like to the second device 106.

In operation S112, the second device 106 stores the initial hash value of the key token, the information about the maximum count, the policy, the information about the validity period of the key token, and the like. In this case, the maximum count stored in the second device 106 will be referred to as a second maximum count.

In operation S114, the second device 106 transmits information (e.g., Max count=100) about the second maximum count stored in the second device 106 to a second device manager 208.

In operation S116, the second device manager 208 transmits the information about the second maximum count (e.g., Max count=100) received from the second device 106 to the token manager 204.

In operation S118, the token manager 204 requests a first device manager 206 to synchronize the hash code.

In operation S120, the first device manager 206 searches for the first device 104 and requests hash code synchronization while transmitting sequentially connected first hash values (i.e., a chain of the first hash values), the policy, information about the maximum count, information about the validity period of the key token, and the like to the first device 104.

In operation S122, the first device 104 encrypts and stores the sequentially connected first hash values (i.e., a chain of the first hash values), the policy, the information about the maximum count, the information about the validity period of the key token, and the like. In this case, the maximum count stored in the first device 104 will be referred to as a first maximum count.

In operation S124, the first device 104 transmits information about the first maximum count (e.g., Max Count=100) stored in the first device 104 to the first device manager 206.

In operation S126, the first device manager 206 transmits the information about the first maximum count (e.g., Max Count=100) received from the first device 104 to the token manager 204.

In operation S128, the token manager 204 compares the first maximum count (e.g., Max Count=100) received from the first device 104 with the second maximum count (e.g., Max Count=100) received from the second device 106. When the first maximum count (e.g., Max Count=100) received from the first device 104 is identical to the second maximum count (e.g., Max Count=100) received from the second device 106, the token manager 204 determines that the hash code synchronization is successfully carried out. In contrast, when the first maximum count received from the first device 104 is not identical to the second maximum count received from the second device 106, the token manager 204 may determine that the hash code synchronization fails, and may re-request the first device manager 204 and the second device manager 206 to synchronize the hash code.

In operation S130, the token manger 204 transmits a hash code synchronization result to the policy manager 202.

Meanwhile, in the above description, the server 102 is described as synchronizing the hash codes stored in the first device 104 and the second device 106 in the course of distributing the hash code to each of the first device 104 and the second device 106, but it is merely an example. The server 102 may perform the above-described synchronization process at any time after the hash code is distributed to each of the first device 104 and the second device 106.

Figure 7:
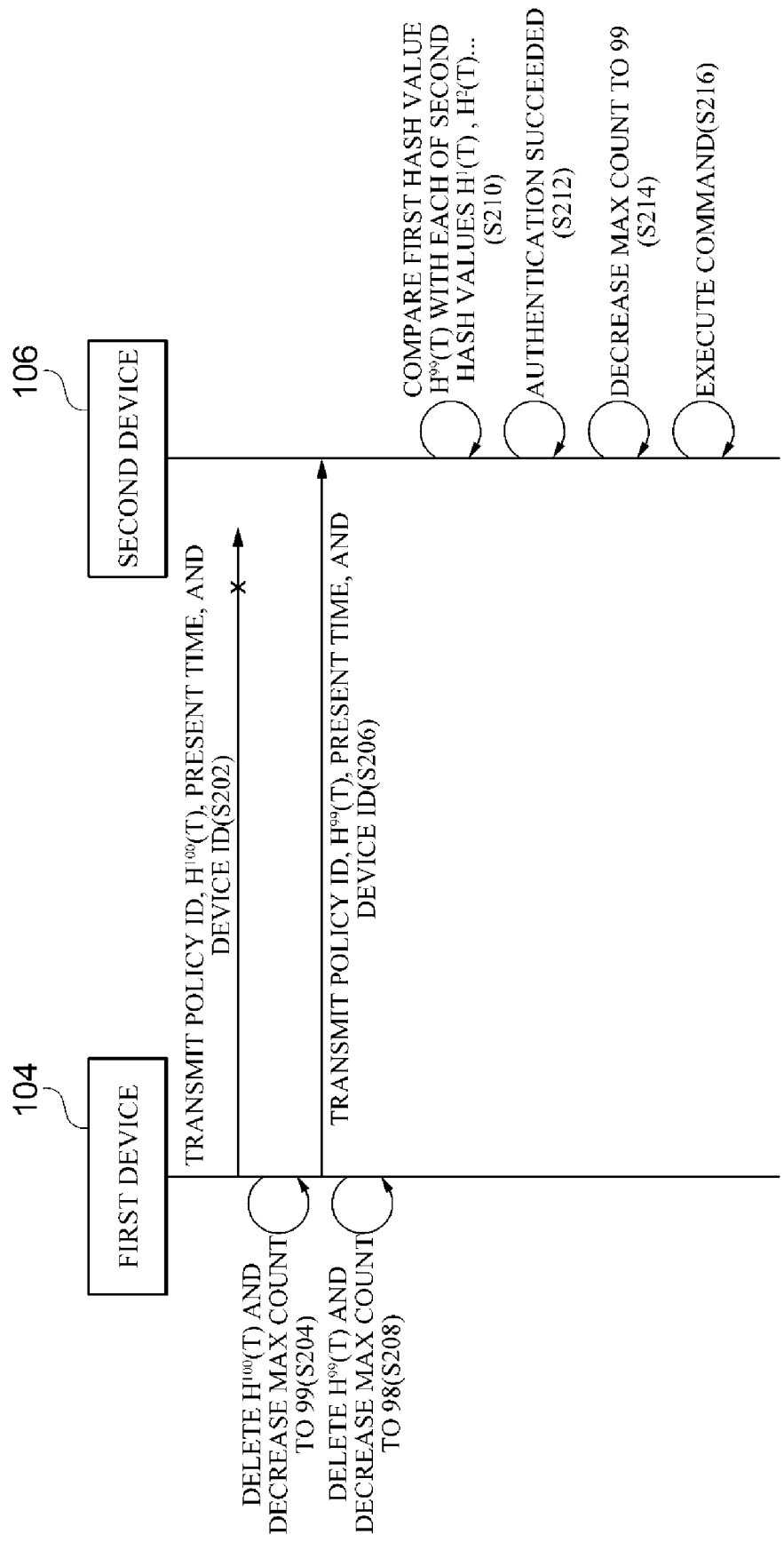
FIG. 7 is a flowchart illustrating a process of authentication between devices according to a first embodiment of the present disclosure.

FIG. 7 is a flowchart illustrating a process of authentication between devices 104 and 106 according to a first embodiment of the present disclosure.

In operation S202, a first device 104 transmits a first hash value corresponding to a first maximum count among a plurality of first hash values. In this case, it is assumed that the first maximum count is, for example, 100. The first device 104 may transmit $H^{100}(T)$, which is a first hash value corresponding to the first maximum value among the plurality of first hash values, to a second device 106 along with an policy, a present time, an ID of the first device 104, and the like. In this case, it is assumed that it fails to transmit $H^{100}(T)$ to the second device 106 due to a network problem or the like.

In operation S204, the first device 104 deletes the transmitted first hash value, i.e., $H^{100}(T)$, from a chain of the first hash values and decreases the first maximum count stored in the first device 104 from 100 to 99. That is, when the first device 104 transmits a first hash value (i.e., $H^N(T)$) obtained by applying a hash function N times to the second device 106, the first device 104 may delete $H^N(T)$ from the above-described chain and decrease the first maximum count from N to N−1.

In operation S206, the first device 104 transmits the first hash value corresponding to the first maximum count among the first hash values. In this case, since the first maximum count is 99, the first device 104 may transmit the first hash value, $H^{99}(T)$, corresponding to the first maximum count to the second device 106 along with the policy, a present time, the ID of the first device 104, and the like. In this case, it is assumed that $H^{99}(T)$ is successfully transmitted to the second device 106.

In operation S208, the first device 104 deletes the transmitted first hash value, i.e., $H^{99}(T)$ from the chain of the first hash values and decreases the first maximum count stored in the first device 104 from 99 to 98.

In operation S210, the second device 106 may authenticate the first device 104 by comparing the received first hash value with each of the second hash values generated by repeatedly hashing the initial hash value a number of times up to the value of the second maximum count until a value identical to the received first hash value appears. In one example, the second device 106 may compare the first hash value $H^{99}(T)$ with each of a second hash value $H^1(T)$, a second hash value $H^2(T)$, a second hash value $H^3(T)$, and so on. In this case, the second device 106 may repeatedly hash the initial hash value a number of times up to the value of the second maximum count until a value identical to the first hash value appears.

In operation S212, when a second hash value identical to the first hash value appears, the second device 106 determines that the first device 104 is successfully authenticated.

In operation S214, when a second hash value hashed N times is identical to the first hash value, the second device 106 decreases the second maximum value to N. In the above example, since the second hash value hashed 99 times, i.e., $H^{99}(T)$ is identical to the first hash value $H^{99}(T)$, the second device 106 may decrease the second maximum count from 100 to 99.

In operation S216, the second device 106 executes a command corresponding to the policy received from the first device 104.

Figure 8:
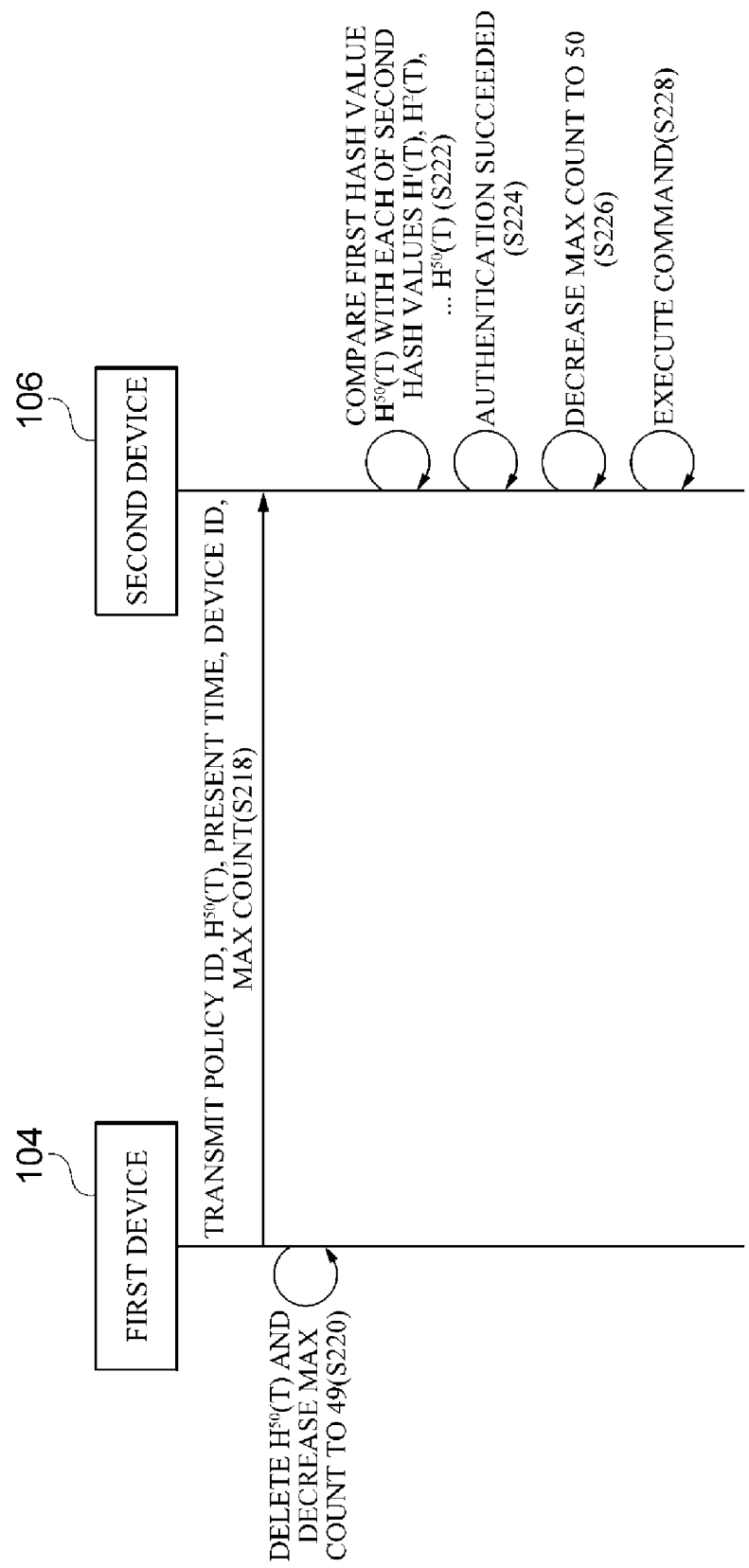
FIG. 8 is a flowchart illustrating a process of authentication between devices according to a second embodiment of the present disclosure.

FIG. 8 is a flowchart illustrating a process of authentication between devices according to a second embodiment of the present disclosure.

In operation S218, a first device 104 transmits a first hash value and a hash number M corresponding to the first hash value to a second device 106. In this case, the hash number M represents the number of times by which a hash function is applied. In one example, the first device 104 may transmit a first hash value $H^{50}(T)$ and a hash number M=50 that corresponds to the first hash value $H^{50}(T)$ to a second device 106.

In operation S220, the first device 104 deletes the transmitted first hash value, i.e., $H^{50}(T)$ from a chain of the first hash values and decreases a first maximum count stored in the first device 104 from 50 to 49.

In operation S222, the second device 106 compares the received first hash value with each of the second hash values generated by repeatedly hashing an initial hash value as many times as the hash number M. In this case, the second device 106 may check whether the hash number M is smaller than a second maximum count. In one example, when the hash number M is 50 and the second maximum count is 51, the second device 106 may confirm that the hash number M, 50, is smaller than the second maximum count, 51. In this case, the second device 106 may compare the first hash value $H^{50}(T)$ with each of a second hash value $H^1(T)$, a second hash value $H^2(T)$, a second hash value $H^3(T)$, . . . and a second hash value $H^{50}(T)$.

In operation S224, when there is a second hash value identical to the first hash value, the second device 106 determines that the first device 104 is successfully authenticated.

In operation S226, when a second hash value hashed N times is identical to the first hash value, the second device 106 decreases the second maximum count to N. In the above example, since the second hash value $H^{50}(T)$ hashed 50 times is identical to the first hash value $H^{50}(T)$, the second device 106 may decrease the second maximum count from 51 to 50.

In operation S228, the second device 106 executes a command corresponding to a policy received from the first device 104.

Figure 9:
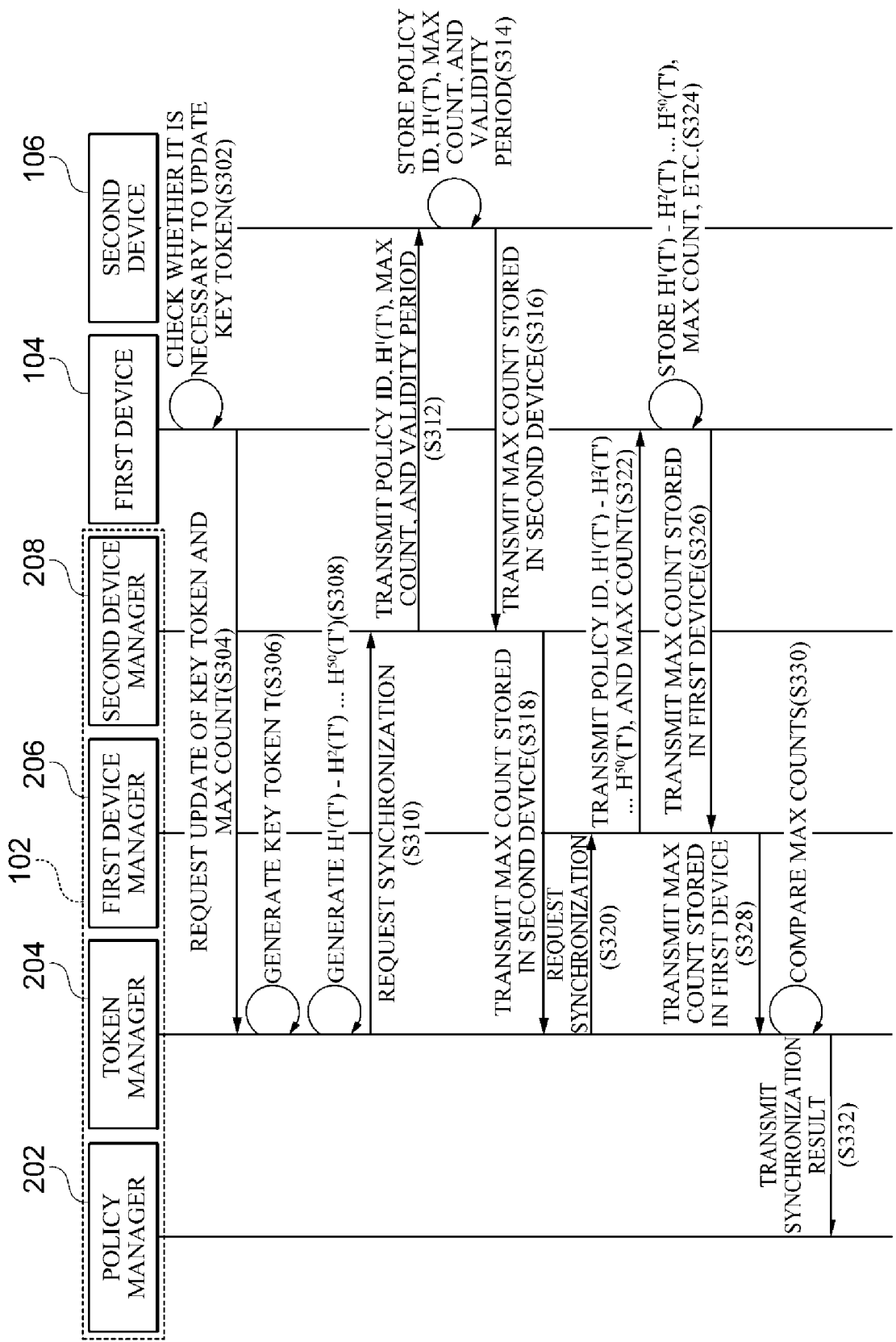
FIG. 9 is a flowchart for describing a process of updating a key token according to the first embodiment of the present disclosure.

FIG. 9 is a flowchart for describing a process of updating a key token according to the first embodiment of the present disclosure.

In operation S302, a first device 104 checks whether a key token generated in a server 102 needs to be updated. In one example, when the number of first hash values connected to a chain (or a value of the maximum count stored in the first device 104) is smaller than or equal to a set value (e.g., 1) in a state where a validity period of the key token remains more than a set period, the first device 104 may determine that the key token needs to be updated.

In operation S304, the first device 104 requests a token manager 204 to update the key token and the maximum count.

In operation S306, the token manager 204 generates a new key token T'.

In operation S308, the token manager 204 sequentially connects first hash values in order of the number of times by which a hash code is applied wherein the first hash values are obtained by repeatedly hashing the key token T' as many times as the set maximum count (e.g., Max Count'=50). In this case, for convenience of description, the updated maximum count is assumed as 50.

In operation S310, the token manager 204 requests a second device manager 208 to synchronize hash code.

In operation S312, the token manager 204 searches for a second device 106 and requests the hash code synchronization while transmitting an initial hash value of the updated key token T', information about the updated maximum count, an policy, information about a validity period of the updated key token T', and the like to the second device 106.

In operation S314, the second device 106 stores the initial hash value of the updated key token T', the information about the updated maximum count, the policy, the information about the validity period of the updated key token T', and the like. In this case, the updated maximum count stored in the second device 106 will be referred to as an updated second maximum count.

In operation S316, the second device 106 transmits information (e.g., Max Count'=50) about the second maximum count stored in the second device 106 to the second device manager 208.

In operation S318, the second device manager 208 transmits the information (e.g., Max Count'=50) about the second maximum count received from the second device 106 to the token manager 204.

In operation S320, the token manager 204 requests the first device manager 206 to synchronize hash code.

In operation S322, the first device manager 206 searches for the first device 104 and requests the hash code synchronization while transmitting the sequentially connected first hash values (i.e., a chain of the first hash values), the policy, the information about the updated maximum count, the information about the validity period of the updated key token T', and the like to the first device 104.

In operation S324, the first device 104 encrypts and stores the sequentially connected first hash values (i.e., the chain of the first hash values), the policy, the information about the updated maximum count, the information about the validity period of the updated key token T', and the like. In this case, the updated maximum count stored in the first device 104 will be referred to as an updated first maximum count.

In operation S326, the first device 104 transmits the information about the first maximum count (e.g., Max Count'=50) stored in the first device 104 to the first device manager 206.

In operation S328, the first device manager 206 transmits the information (e.g., Max Count'=50) about the first maximum count received from the first device 104 to the token manager 204.

In operation S330, the token manager 204 compares the information (e.g., Max Count'=50) about the first maximum count received from the first device 104 with the information (e.g., Max Count'=50) about the second maximum count received from the second device 106. When the information (e.g., Max Count'=50) about the first maximum count received from the first device 104 is identical to the information (e.g., Max Count'=50) about the second maximum count received from the second device 106, the token manager 204 determines that the hash code synchronization is successfully carried out.

In operation S332, the token manger 204 transmits a hash code synchronization result to a policy manager 202.

Operations S302 and S304 are described as being performed by the first device 104, but the aspects of the present disclosure are not limited thereto, and operations S302 and S304 may be performed by the second device 106 according to an embodiment.

Figure 10:
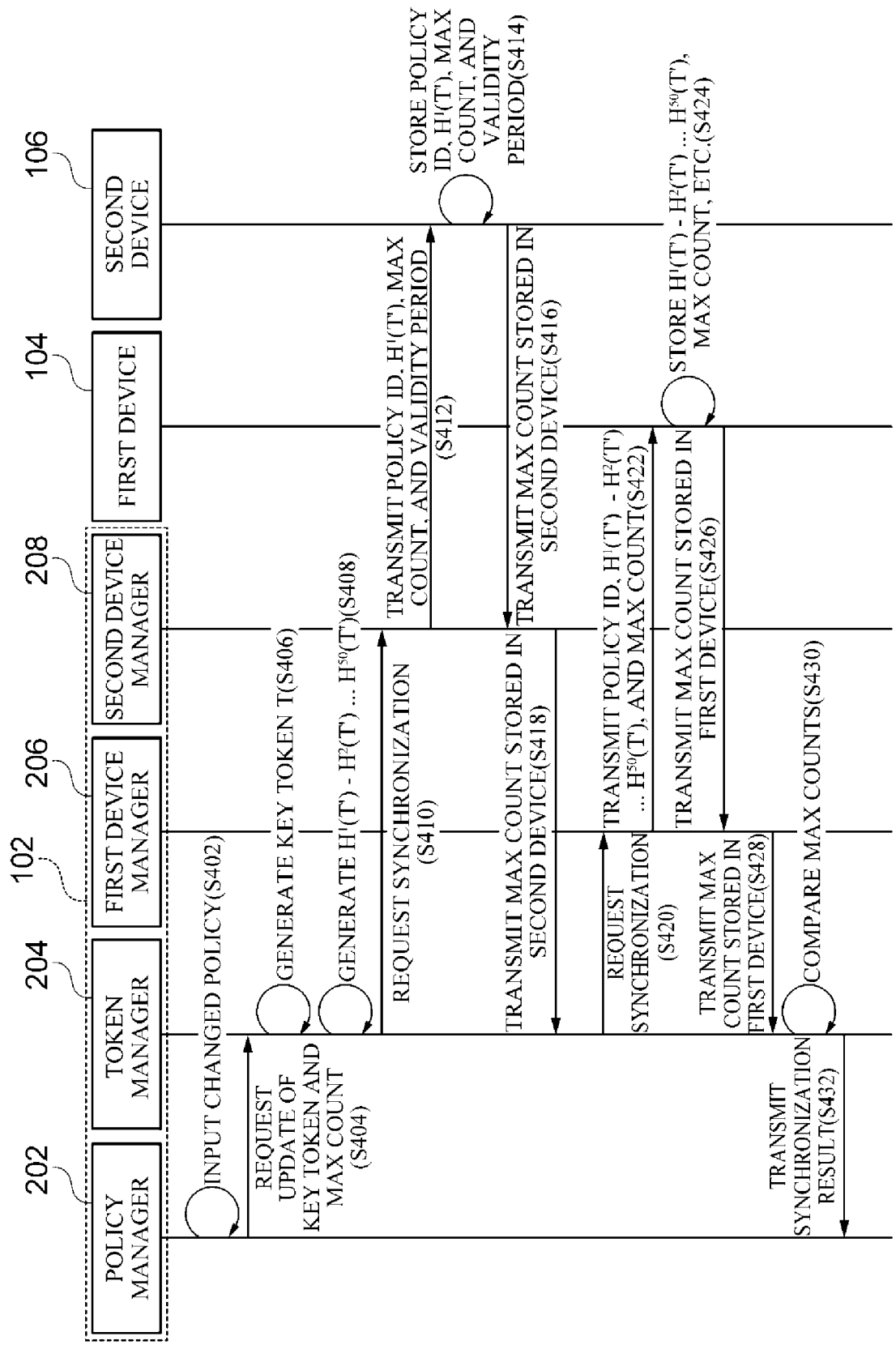
FIG. 10 is a flowchart illustrating a process of updating a key token according to the second embodiment of the present disclosure.

FIG. 10 is a flowchart illustrating a process of updating a key token according to the second embodiment of the present disclosure.

In operation S402, a policy manager 202 receives a changed policy from a legacy system.

In operation S404, the policy manager 202 requests a token manager 204 to update a key token and the maximum count according to the change of policy.

Thereafter, operations S406 to S432 are performed. Since operations S406 to S432 are the same as operations S306 to S332, detailed descriptions thereof will be omitted.

Figure 11:
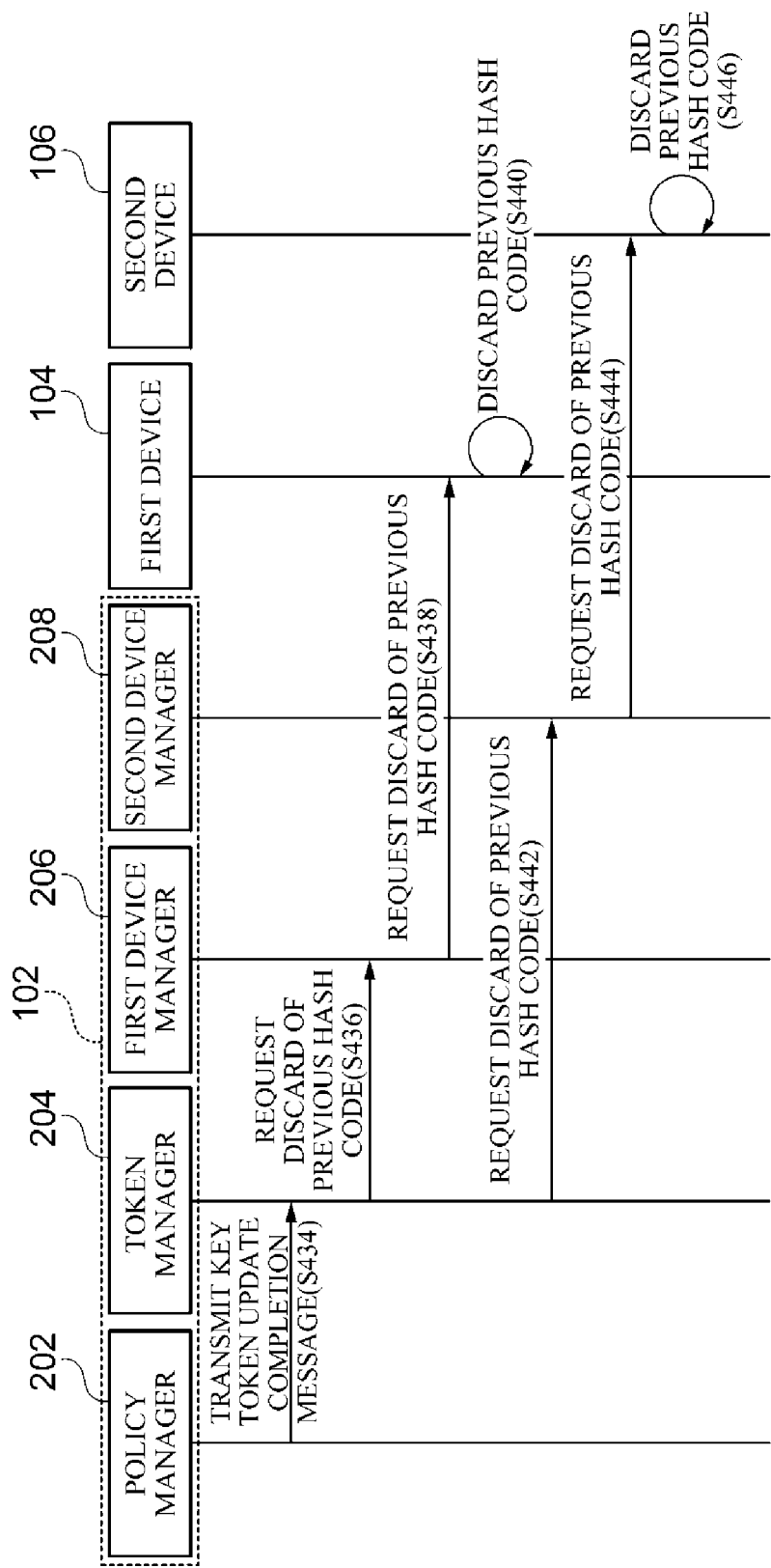
FIG. 11 is a flowchart for describing a process of discarding a previous key token according to the update of the key token in FIG. 10.

FIG. 11 is a flowchart for describing a process of discarding a previous key token according to the update of the key token in FIG. 10.

In operation S434, the policy manager 202 transmits a key token update completion message to the token manager 204.

In operation S436, the token manager 204 request the first device manager 206 to discard previous hash code stored in the first device 104.

In operation S438, the first device manager 206 requests the first device 104 to discard the previous hash code stored in the first device 104.

In operation S440, the first device 104 discards the previous hash code stored in the first device 104.

In operation S442, the token manager 204 requests the second device manager 208 to discard previous hash code stored in the second device 106.

In operation S444, the second device manager 208 requests the second device 106 to discard the previous hash code stored in the second device 106.

In operation S446, the second device 106 discards the previous hash code stored in the second device 106.

Figure 12:
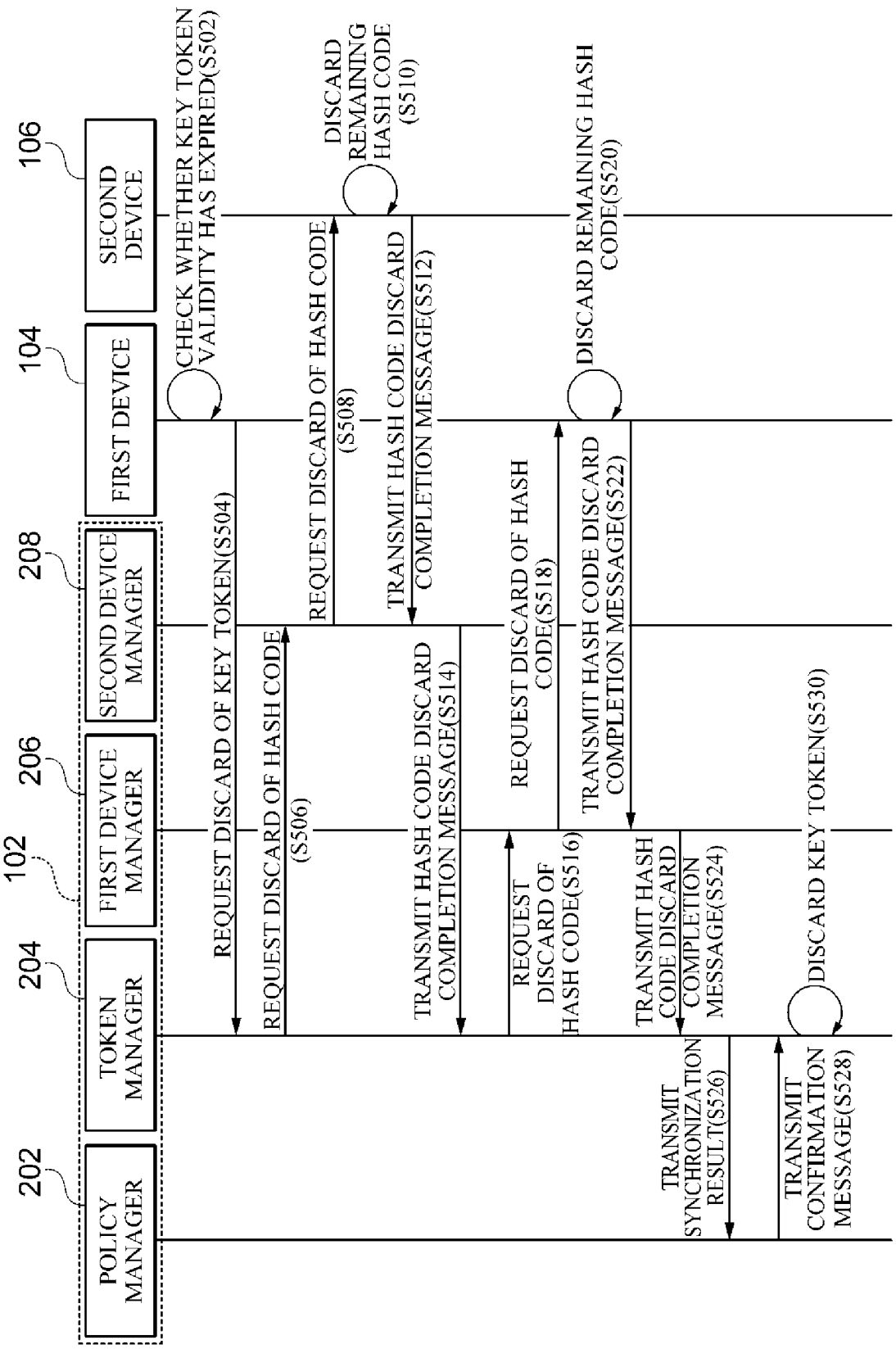
FIG. 12 is a flowchart for describing a process of discarding a key token according to the first embodiment of the present disclosure.

FIG. 12 is a flowchart for describing a process of discarding a key token according to the first embodiment of the present disclosure.

In operation S502, the first device 104 checks whether validity of a key token generated in the server 102 has expired. In one example, the value of the maximum count stored in the first device 104 is smaller than or equal to a set value (e.g., 1) in a state where a validity period of the key token remains less than a set period, the first device 104 may determine that it is necessary to discard the key token.

In operation S504, the first device 104 requests the token manager 204 to discard the key token.

In operation S506, the token manager 204 requests the second device manager 208 to discard hash code stored in the second device 106.

In operation S508, the second device manager 208 requests the second device 106 to discard remaining hash code stored in the second device 106.

In operation S510, the second device 106 discards the remaining hash code stored in the second device 106.

In operation S512, the second device 106 transmits a hash code discard completion message to the second device manager 208.

In operation S514, the second device manager 208 transmits the hash code discard completion message received from the second device 106 to the token manager 204.

In operation S516, the token manager 204 requests the first device manager 206 to discard hash code stored in the first device 104.

In operation S518, the first device manager 206 requests the first device 104 to discard the remaining hash code stored in the first device 104.

In operation S520, the first device 104 discards the remaining hash code stored in the first device 104.

In operation S522, the first device 104 transmits a hash code discard completion message to the first device manager 206.

In operation S524, the first device manager 206 transmits the hash code discard completion message received from the first device 104 to the token manager 204.

In operation S526, the token manager 204 transmits a hash code synchronization result to the policy manager 202.

In operation S528, the policy manager 202 transmits a confirmation message with respect to the synchronization result to the token manager 204.

In operation S530, the token manager 204 discards a key token stored in the server 102.

Meanwhile, in the present embodiment, operations S502 and S504 are described as being performed by the first device 104, but aspects of the present disclosure are not limited thereto, and operations S502 and S504 may be performed by the second device 106 according to an embodiment.

Figure 13:
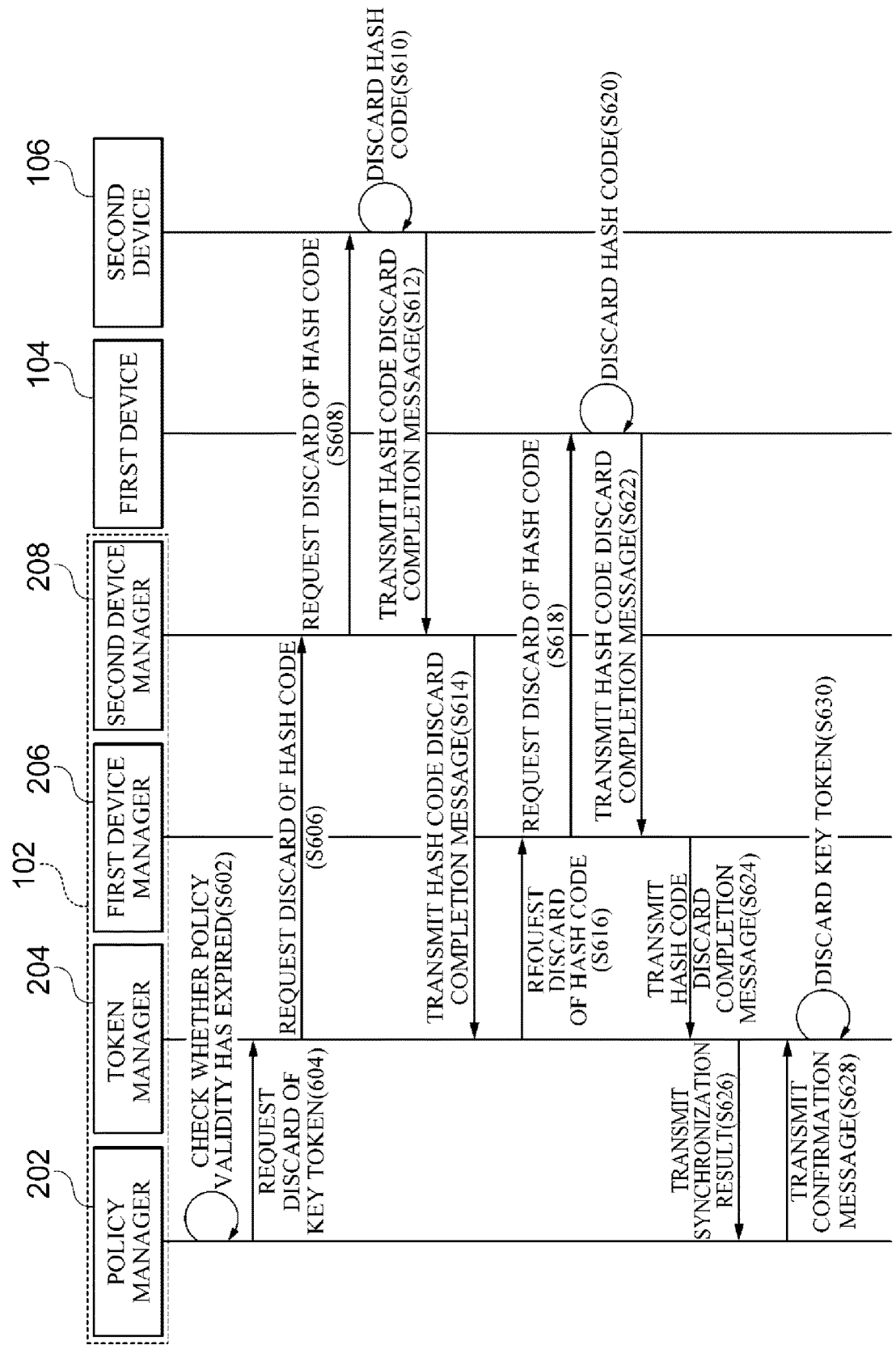
FIG. 13 is a flowchart for describing a process of discarding a key token according to the second embodiment of the present disclosure.

FIG. 13 is a flowchart for describing a process of discarding a key token according to the second embodiment of the present disclosure.

In operation S602, the policy manager 202 checks whether validity of an policy has expired. In one example, when a validity period of the policy or a key token has expired, the policy manager 202 may determine that it is necessary to discard the key token.

In operation S604, the policy manager 202 requests the token manager 204 to discard the key token.

Thereafter, operations S606 to S630 are performed. Operations S606 to S630 are the same as operations S506 to S530 described above, and hence detailed descriptions thereof will be omitted. Meanwhile, in the present embodiment, it is described that the server 102 discards the key token when the validity of the key token or the policy has expired, but aspects of the present disclosure are not limited thereto. For example, the server 102 may discard the key token when the validity of the key token is lost, such as when malicious code is detected in the first device 104 or the second device 106, or when it is determined that a user's ID is falsified. In addition, the server 102 may discard the key token according to an enforcement action by an administrator.

Meanwhile, the above-described communication system 100 may be applied to various services, such as a vehicle reservation and control service, a door-lock control service, and the like. In one example, when the communication system 100 is applied to a vehicle reservation and control service, the first device 104 may be a user terminal carried by the user, for example a smartphone, and the second device 106 may be a security module mounted in the vehicle, for example, a crypto service manager (CSM).

In this case, the user may input a reservation request and reservation period for the use of the vehicle through a mobile application installed in the first device 104. The server 102 may receive information about the reservation request and reservation period from a legacy system (not shown) associated with the first device 104 and may generate a key token and the maximum count when the user's reservation for the vehicle is completed. At this time, a first maximum count and a second maximum count may be proportional to the user's reservation period for the vehicle. For example, when the user's reservation period is 5 days, the first maximum count and the second maximum count may each be 100. When the user's reservation period is 3 days, the first maximum count and the second maximum count may each be 50. In addition, when the user's reservation for the vehicle is changed, the server 102 may discard the generated key token and re-generate a new key token.

When the user's reservation for the vehicle is completed or the reservation is changed, the server 102 may transmit first hash values, a sequential connection relationship among the first hash values, and information about the first maximum count to the first device 104 and may transmit an initial hash value of the key token and information about the second maximum count to the second device 106. However, the key token and the maximum count are not necessarily generated in the server 102, and may be generated in the first device 104, the second device 106, or other elements.

In addition, when the user cancels the reservation for the vehicle, the server 102 may discard the generated key token and request each of the first device 104 and the second device 106 to discard the first hash values and second hash values.

Figure 14:
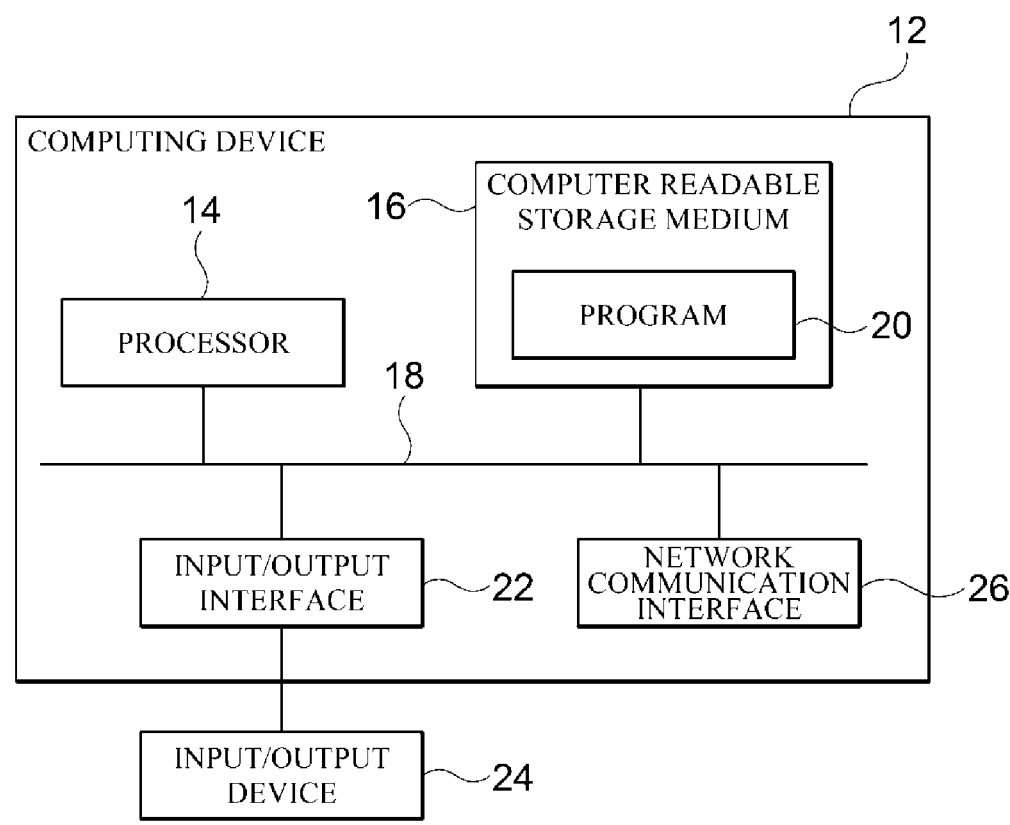
FIG. 14 is a block diagram for describing a computing environment including a computing device suitable to use in the illustrative embodiments.

FIG. 14 is a block diagram for describing a computing environment including a computing device suitable to use in the illustrative embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in the server 102, the first device 104, the second device 106, or the relay device 108.

The computing device 12 includes at least one processor 14, a computer-readable storage medium 16, and a communication bus 18. The processor 14 may cause the computing device 12 to operate in accordance with the aforementioned illustrative embodiments. For example, the processor 14 may execute one or more programs 20 stored in the computer-readable storage medium 16. The one or more programs may include one or more computer-executable instructions, which, when executed by the processor 14, cause the computing device 12 to perform operations in accordance with the illustrative embodiments.

The computer-readable storage medium 16 is configured to store computer-executable instructions, program code, program data, and/or other suitable forms of information. The program 20 stored in the computer-readable storage medium 16 includes a set of instructions executable by the processor 14. In one embodiment, the computer-readable storage medium 16 may be memory (volatile memory, such as random access memory (RAM), non-volatile memory, or any suitable combination thereof), one or more magnetic disc storage devices, optical disk storage devices, flash memory devices, and other forms of storage media accessible by the computing device 12 and capable of storing desired information, or any suitable combination thereof.

The communication bus 18 interconnects other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the embodiments of the present disclosure, it is possible to easily authenticate a counterpart device using a one-time key $H^N(T)$ for a D2D communication between a first device and a second device, without using a separate secure channel (e.g., secure sockets layer (SSL), transport layer security (TLS), or the like) in an environment where it is difficult to synchronize the first device with the second device without intervention of a server. In this case, each time each of the two devices uses the one-time key, the used one-time key is deleted and the maximum count N on each device side is decreased by one, so that it is possible to easily synchronize the two devices and even when the one-time key already used is leaked, it cannot be reused and hence the security of the D2D communication can be improved.

In addition, according to the embodiments of the present disclosure, it is possible to effectively manage a life cycle of a key token, such as generation, update, and discard of the key token, in consideration of one or more of a validity period of a key token, a value of a device-side maximum count, and a policy input to the server.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A server comprising:
at least one hardware processor configured to implement:
a token manager configured to:
generate, upon receiving an policy, a key token associated with a validity period, and
obtain a plurality of first hash values by hashing the key token a number of times up to a maximum count;
a first device manager configured to transmit the plurality of first hash values and information about the maximum count to a first device; and
a second device manager configured to transmit an initial hash value of the key token and the information about the maximum count to a second device,
wherein the token manager is further configured to, based on at least one of the validity period, a value of the maximum count, and the policy: discard either or both of the key token and the maximum count.

2. The server of claim 1, wherein the first device manager is further configured to transmit the plurality of first hash values to the second device one by one in a reverse order of a generation of the plurality of first hash values, and
wherein the token manager is further configured to:
receive, when a value of a first maximum count stored at the first device is smaller than or equal to a set value and the validity period is more than a set period, a request from the first device to update the key token and the first maximum count, and to update the key token and the first maximum count at the first device in response to the request for update.

3. The server of claim 2, wherein the token manager is further configured to: receive a request from the first device to discard the key token, and discard the key token in response to the request.

4. The server of claim 1, wherein the token manager is further configured to discard the key token when a current time indicates that the validity period is expired.

5. The server of claim 1, wherein the at least one hardware processor is further configured to implement: a policy manager configured to receive the policy, wherein the token manager is further configured to update, when the policy received by the policy manager is changed, either or both of the key token and the maximum count.

6. The server of claim 1, wherein the first device manager is further configured to receive, from the first device, information about a first maximum count stored at the first device, and
wherein the second device manager is further configured to receive, from the second device, information about a second maximum count stored at the second device, and wherein the token manager is further configured to compare the first maximum count with the second maximum count to determine whether a hash code synchronization has completed successfully.

7. A method of managing a token, comprising:
generating, at a token manager upon receiving an policy, a key token associated with a validity period;
obtaining, by the token manager, a plurality of first hash values by hashing the key token a number of times up to a maximum count;
transmitting, by a first device manager, the plurality of first hash values and information about the maximum count to a first device;
transmitting, by a second device manager, an initial hash value of the key token and the information about the maximum count to a second device; and
discarding, by the token manager based on at least one of the validity period, a value of the maximum count, and the policy, either or both of the key token and the maximum count.

8. The method of claim 7, wherein: the transmitting by a first device manager further comprises:
transmitting the plurality of first hash values to the second device one by one in a reverse order of generation of the plurality of first hash values, deleting, after transmitting an Nth first hash value among the plurality of first hash values, the Nth first hash value, and wherein the discarding by the token manager comprises receiving a request from the first device to update the key token and the maximum count, and updating the key token and the maximum count at the first device in response to the request for update.

9. The method of claim 8, wherein the discarding by the token manager further comprises: receiving a request from the first device to discard the key token, and discarding the key token.

10. The method of claim 7, wherein the discarding by the token manager comprises discarding the key token when the validity period is expired.

11. The method of claim 7, further comprising:
after the transmitting by the second device manager:
receiving, by the first device manager from the first device, second information about a first maximum count stored at the first device;
receiving, by the second device manager from the second device, third information about a second maximum count stored at the second device; and
comparing, at the token manager, the first maximum count with the second maximum count to determine whether a hash code synchronization has completed successfully.

12. A method of managing a token, comprising:
- generating, at a token manager upon receiving an policy, a key token associated with a validity period;
- obtaining, by the token manager, a plurality of first hash values by hashing the key token a number of times up to a maximum count;
- transmitting, by a first device manager, the plurality of first hash values and information about the maximum count to a first device;
- transmitting, by a second device manager, an initial hash value of the key token and the information about the maximum count to a second device; and
- updating, by the token manager based on at least one of the validity period, a value of the maximum count, and the policy, either or both of the key token and the maximum count, wherein a server comprises the token manager, the first device manager, the second device manager, and a policy manager.

13. The method of claim 12, further comprising receiving, prior to the generating of the key token at the token manager, an policy, wherein the updating by the token manager comprises updating either or both of the key token and the maximum count when the policy received by the policy manager is changed.

* * * * *